Nov. 23, 1965  R. H. MUMMA  3,218,689
EXPANDED METAL PRESS

Filed March 1, 1963  7 Sheets-Sheet 1

INVENTOR.
ROY H. MUMMA
BY
Marshal, Biebel, French & Bugg
ATTORNEYS

Nov. 23, 1965   R. H. MUMMA   3,218,689
EXPANDED METAL PRESS
Filed March 1, 1963   7 Sheets-Sheet 3

INVENTOR.
ROY H. MUMMA
BY
*Marechal, Biebel, French & Bugg*
ATTORNEYS

Nov. 23, 1965 R. H. MUMMA 3,218,689
EXPANDED METAL PRESS
Filed March 1, 1963 7 Sheets-Sheet 5

INVENTOR.
ROY H. MUMMA
BY
*Marshal, Biebel, French & Bugg*
ATTORNEYS

United States Patent Office

3,218,689
Patented Nov. 23, 1965

3,218,689
EXPANDED METAL PRESS
Roy H. Mumma, Springfield, Ohio, assignor to The Urbana Tool and Die Co., Urbana, Ohio, a corporation of Ohio
Filed Mar. 1, 1963, Ser. No. 261,982
12 Claims. (Cl. 29—6.2)

The present invention relates to a press for producing a product known commercially as "expanded metal" from an imperforate sheet of metal.

Expanded metal sheets are utilized for a wide variety of products, for example, lath for backing in plastering walls, grill work, ventilating housings, and other products when a regularly perforated metal screen is desirable in some cases with a particular design or pattern in the screen. Such expanded metal product is produced by a toothed die or dies which form regularly spaced and disconnected slits in an imperforate sheet of metal, and expand or stretch the sections of the metal between slits to leave an opening of predetermined size and shape where each slit is formed. The present invention is particularly concerned with apparatus for producing such an expanded metal product at substantially higher speeds than heretofore possible. Essentially, this is accomplished by separating the forming operations of the die or dies into two dimensional movements, thereby greatly reducing the inertia effects on the dies and enabling substantially higher rates of working strokes than are presently achieved.

Accordingly, the primary object of this invention is to provide a novel press for making an expanded metal product wherein high speeds of operation are attained, substantially in excess of present equipment available for this purpose.

Another object of the invention is to provide an expanded metal press wherein the slitting and expanding operations are performed by cooperating dies or cutters each of which is moved only in a reciprocating fashion, but in planes which intersect each other, thereby achieving the required offsetting of successive slits formed in spaced relation through an imperforate sheet followed by stretching of the connecting parts of the sheet between adjacent slits.

A further object of the invention is to provide a press for making an expanded metal product in which an imperforate sheet of metal is fed in incremental fashion through a forming nip, defined by a reciprocating press element having a cutting edge moving in a direction normal to the feeding direction and a cutter die cooperating with such cutting edge and having a series of teeth thereon past parts of which the cutting edge is moved, to form a series of slits in the sheet during each stroke of the press element, and wherein the cutter die is shifted transversely of the sheet between successive strokes of the press element to offset the slits formed in successive rows in the sheet.

An additional object of the invention is to provide such an expanded metal press wherein the cutter die is rapidly shifted, during the down stroke of the cutting edge of the press element clear of the teeth on the cutter die, by a linear actuator which is powered separately from the main drive for the reciprocating press element and the shifting of which actuator is timed with respect to the main drive to accomplish rapid and precise shifting of the cutter die.

Another object of the invention is to provide such an expanded metal press wherein a control is included to count the number of cutting strokes of the press, for the purpose of limiting the cutting strokes to form expanded metal sheets of predetermined size.

Another object of the invention is to provide such an expanded metal press wherein the shifting action of the actuator for the cutter die is controlled to vary the pattern of openings formed in the sheet metal.

A further object of this invention is to provide such a press wherein the feed of the stock sheet into the forming nip is adjustably controlled, for example by driving feed rolls with an independently controlled hydraulic motor, to change the amount of feed or to terminate the feed and cause cut-off of the expanded sheet from the stock.

Other objects and advantages of the invention will be apparent from the following description, the accompanying drawings and the appended claims.

The present invention involves basically the construction of an expanded metal press in which the press elements and cutter dies are moved only in reciprocating fashion. In other words, these parts are reciprocated to and fro, but do not partake of a movement in a third direction. Thus, with proper balancing, etc., it is possible to reciprocate these parts in correlation and at relatively high speeds thereby providing a machine which is capable of producing expanded metal pieces at considerably greater speeds than heretofore obtained.

Furthermore, by controlling the motion of the cutter die of the press in such manner, it is possible to obtain variations in the design of the expanded metal product, even while the press is operating. It is thus possible to change the design of the product pieces while the machine is operating, and this permits the obtaining of a substantial variety of designs from the press, without even changing the form of the cutter die.

Several different constructional embodiments of the invention are disclosed herein, together with various suitable controls. Thus, the type of machine shown in FIGS.

1 and 4–7 involves a mechanical drive press for reciprocating the press element, a correlated mechanical drive for feed of the sheet stock into the press, and a hydraulically driven and controlled cutter die. The modification shown in FIG. 9 embodies a correlated mechanical drive for the cutter die also, and thus is a fully mechanical construction. The machine illustrated in FIG. 12 operates on the same principle, but embodies a mechanical drive for reciprocating the press-element in combination with hydraulic drives and controls for both the cutter die and the stock feed. It will be understood, therefore, that the present invention encompasses a variety of constructional embodiments involving the foregoing principles of construction and operation.

Figure 4:
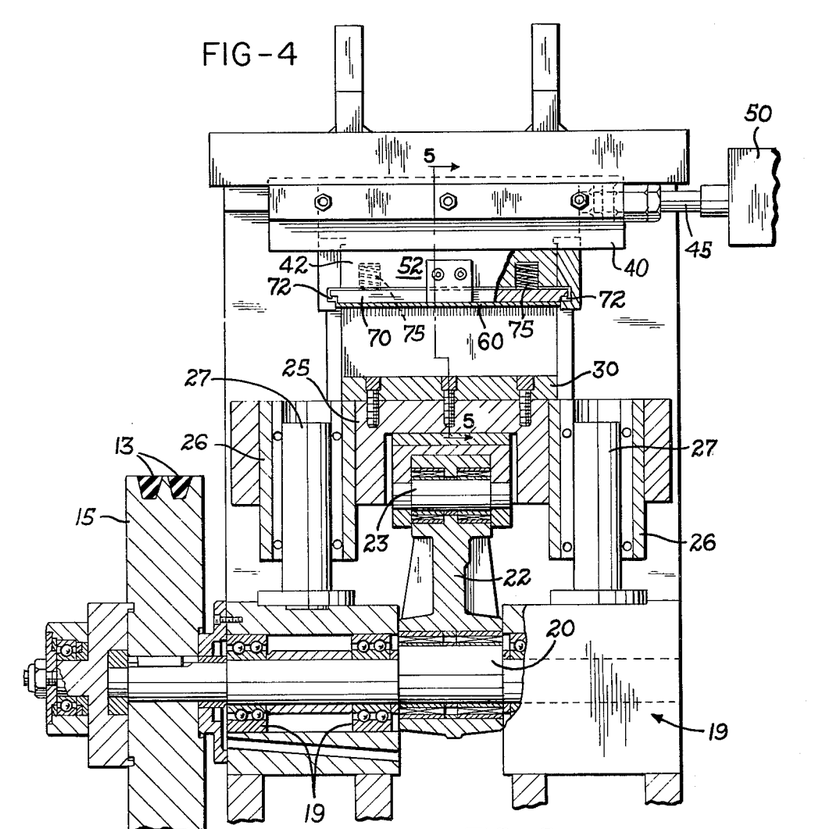
FIG. 4 is a sectional view taken vertically through the press shown in FIG. 1, with some parts shown in elevation, and illustrating the overall mounting and drive arrangement of the press element and the cutter die.

Referring to the drawings, which illustrate preferred embodiments of the invention, and particularly to FIGS. 1 and 4-7, the press includes a base or stand structure indicated generally at 10, and within which the main drive motor 12 is mounted. This motor is connected through drive belts 13, or their equivalent to rotate a fly wheel 15, and the fly wheel is mounted on the end of a crank shaft 18 which is supported by suitable bearings 19, as shown in FIG. 4. The crank shaft includes a crank portion 20 upon which is mounted a connecting rod 22, and this rod is connected through wrist pin 23 to a reciprocable head 25. The head is provided with a pair of depending guide tubes 26 which are received by vertical guide rods 27, and these rods are mounted on the base 10 to assure that the head 25 reciprocates in a predetermined direction, preferably vertically.

The head 25 carries a mounting bracket 30 on which a press element 32 is supported. This element preferably includes a flat upper surface 33 terminated in a straight cutting edge 35, and the press element is, of course, reciprocated with the head 25.

Figures 1, 2, 3:
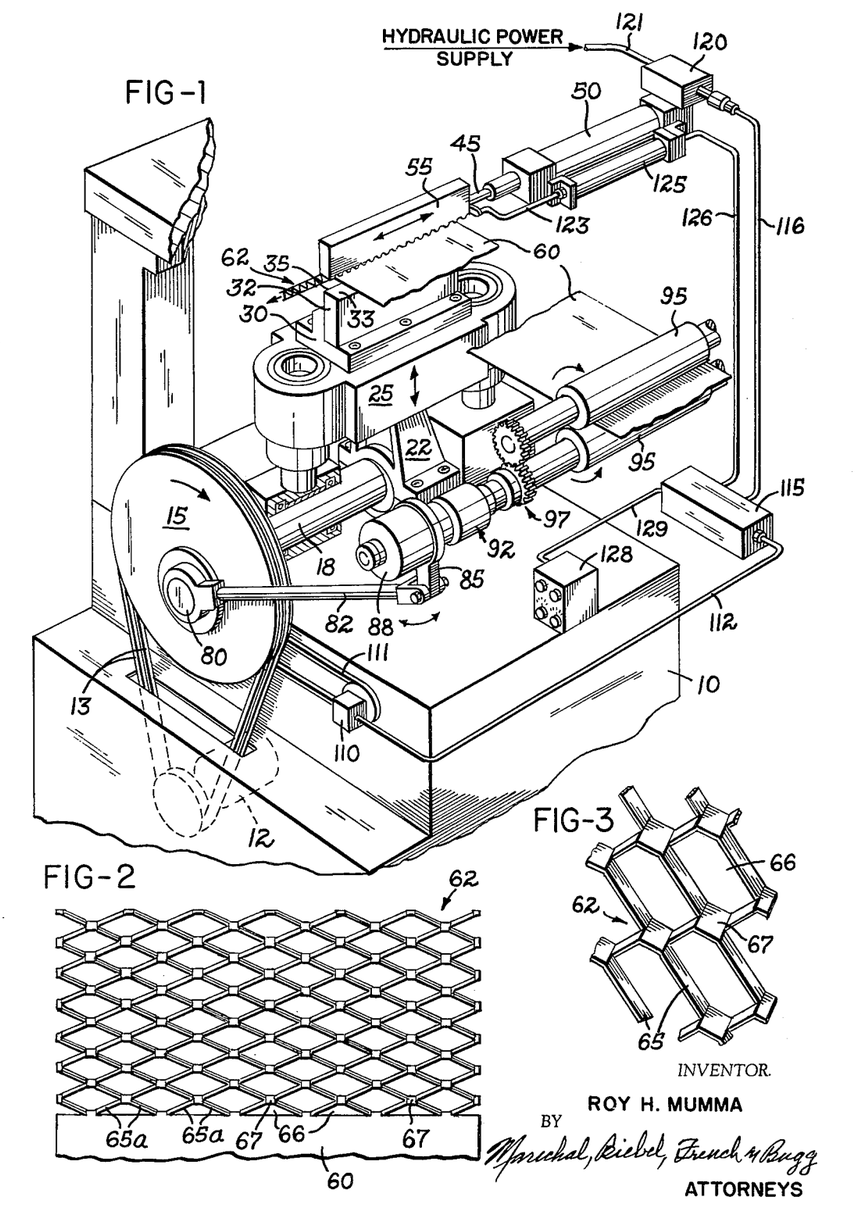
FIG. 1 is a schematic perspective view, with some parts broken away, showing the overall arrangement of a press according to the invention.
FIGS. 2 and 3 are detailed views on an enlarged scale, FIG. 3 being an enlarged perspective view of a fragment of FIG. 2, showing a typical expanded metal screening which is the product of the press.

Above the press element there is a guide way structure 40 in which a slide 42 is mounted for sliding movement. This slide member is bolted or otherwise secured to one end of a reciprocable drive rod 45 which may be conveniently shifted back and forth by a suitable power source such as the double acting hydraulic cylinder shown generally at 50 (FIG. 1). A mounting block 52 (FIG. 5) depends from slide 42, preferably being an integral part of the slide. On one face of the mounting block there is carried a cutter die 55.

Figure 5:
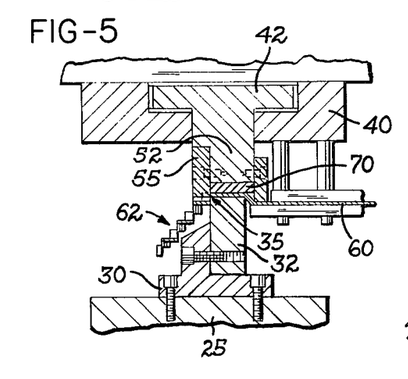
FIG. 5 is a detailed sectional view taken on line 5—5 of FIG. 4.
Figure 6:
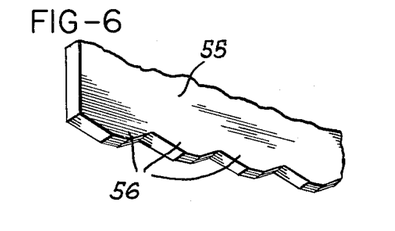
FIG. 6 is an enlarged perspective veiw showing a portion of the cutter die.

This die, as shown particularly in FIG. 6, has a toothed cutting edge configuration, the form and depth of the teeth 56 being of predetermined shape and dimensions according to the desired pattern in the expanded metal screening product obtained from the press. One edge of the die 55 is aligned with the cutting edge 35 of the press element, as best seen in FIG. 5, and these two parts thus form between them a forming and slitting nip into which an imperforate sheet of metal stock or other material is fed. Thus, a portion of an imperforate metal sheet 60 is shown in FIGS. 1 and 5 being fed into the forming nip, and the expanded metal product made from the sheet is shown generally at 62, leaving the forming nip.

The operation of the press element and forming die causes a number of spaced apart slits to be made in the imperforate sheet, and as such slits are made, the parts of metal bounding these slits are stretched to form elongated openings in the sheet. For example, referring to FIGS. 2 and 3, when the press element 33 is raised against the toothed die element 55, each tooth 56 will engage a portion of the sheet and the cutting edge 35 of the press element will "wipe" across the edge of the teeth carrying the sheet upward and enlarging the slits as the sheet is moved upward and greater portions are engaged by the expanding configuration of the tapered teeth. At the same time, that portion of the sheet which is underneath the die 55, as determined by the amount that the sheet 60 has been fed forward prior to closing of the forming nip, will be formed around the teeth 56 and thus stretched or offset from the plane of the imperforate sheet. This results in a stretching of the connecting parts 65, and the enlarged openings 66 are thus formed in the sheet.

As the piston head 25 moves downward at the end of its upward or forming stroke, the sheet will be carried with it (by apparatus to be described) and as the sheet 60 is fed forward through the forming nip, the cylinder 50 is actuated to shift the cutter die 55, aligning the bottom edges of the teeth 56 with the unslit portions of the sheet, or in other words with the previously formed part of the sheet, or in other words with the connecting areas 67 between the stretched parts 65. Therefore, when the head makes its next upward working stroke the slits will be formed in the sheet offset from the previous plurality of slits, and the parts 65a will be stretched and formed to cause the characteristic pattern to form in the sheet, for example the diamond-shaped openings 66 as shown in FIGS. 2 and 3. Obviously, the size, dimensions, and form of these openings will depend upon the configuration of the teeth 56 and the manner in which the die 55 is shifted. For example, it would be possible to shift the die less than one-half the distance between adjacent teeth, and a different pattern would result in the expanded product.

The stroke of the press element 32, and thus of the piston head 25 will be regulated such that at the top-dead-center position, the edge 35 will not reach the root areas of the teeth 56. This is, of course, necessary to avoid completely severing the sheet during a forming stroke. As the press element moves downward after a forming stroke, a stripper bar 70, carried by the mounting block 52 and movable within notches 72 in the corners thereof, is forced down against the sheet 60 by the springs 75. This assures that the sheet descends in contact with the press element and is carried clear of the cutter die before the next feed operation begins.

The feed mechanism (FIGS. 1, 7 and 8) is provided by an eccentric 80 operating through a connecting rod 82 to reciprocate a crank 85 once for each revolution of fly wheel 15. The crank is connected to provide the input to a one-way drive clutch 88, and the output of this clutch through shaft 90 provides the intermittent rotary drive motion for the feed mechanism. Shaft 90 extends into a conventional magnetic clutch 92, providing the intermittent rotary input thereto, and the output of this clutch is directed to a pair of counter-rotating feed rolls 95, one of which is driven by the magnetic clutch output shaft 96, and the other of which is driven through gearing 97 connected to such output shaft as shown particularly in FIG. 7.

The sheet of stock 60 is passed between the rolls 95, and thus at a predetermined time during each revolution of fly wheel 15, the feed rolls will rotate through a predetermined angular movement to feed sheet 60 forward through the forming nip by the desired amount.

Figures 7, 8, 9:
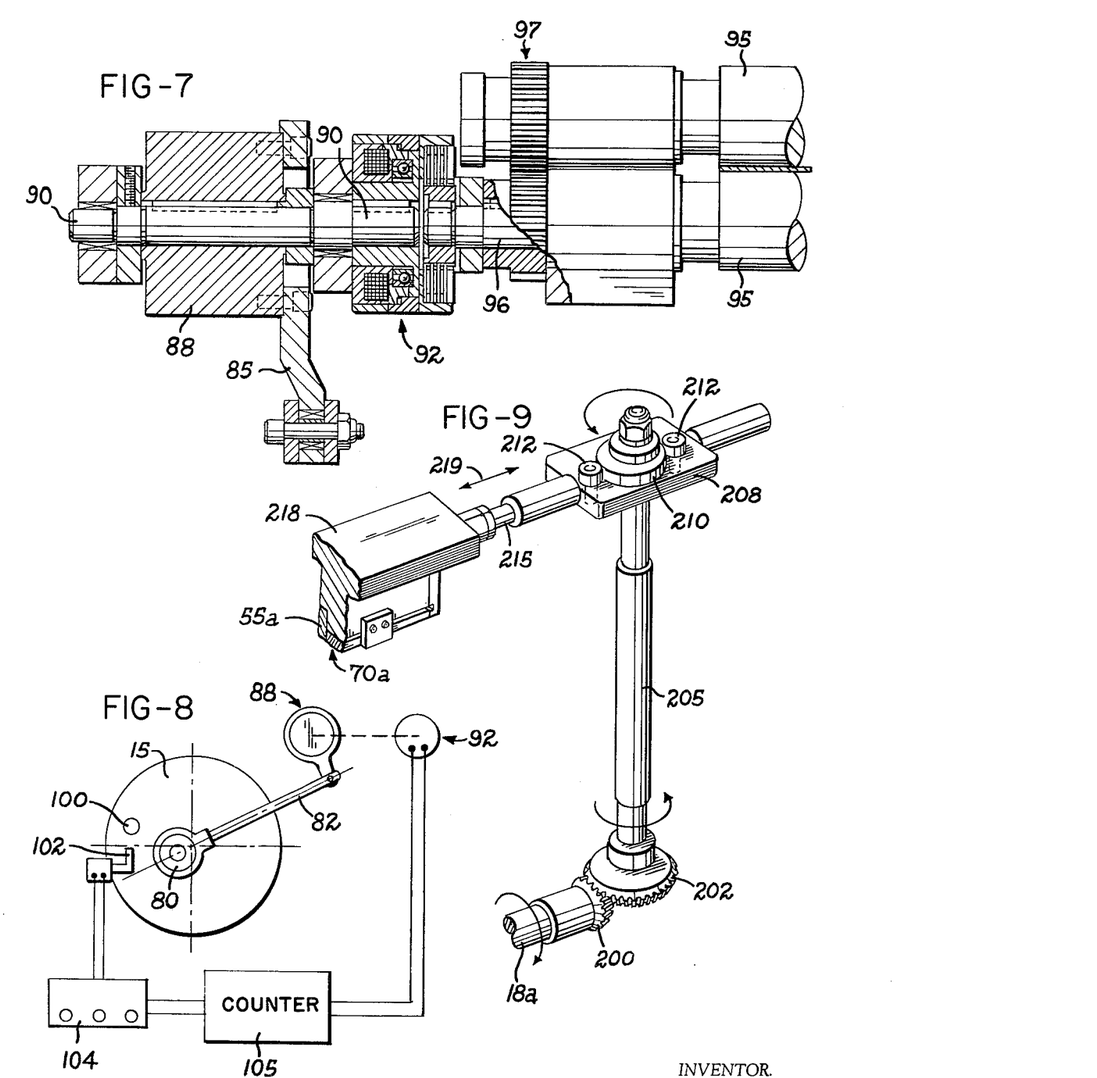
FIG. 7 is an enlarged view of a drive for the feed rolls for the press, with the control clutches shown in section.
FIG. 8 is a schematic view of an embodiment of a counting apparatus in the press control.
FIG. 9 is a perspective view showing the general arrangement of a modification embodying a mechanical drive for reciprocating the cutter die.

As shown in FIG. 8, an automatic control over the number of feed movements of the feed rolls can be provided by mounting a small permanent magnet 100 (or by an equivalent magnetized portion) on the fly wheel 15 or on a part driven at the same speed as such fly wheel. This magnet is arranged to pass once for each revolution past a magnetic impulse pickup head 102, and the resultant momentary magnetic field creates an impulse from this head which passes through a conventional electronic amplifier 104 which in turn has its output connected to a counter 105. This counter can be connected as shown to control the magnetic clutch 92. For example, a suitable arrangement may include a counter which can be preset such that it will maintain the clutch 92 energized until a predetermined number of counts, and thus a predetermined number of strokes of the press element, have occurred. The counter can then be arranged to deenergize the magnetic clutch and break the power train to the feed rolls. This in turn will stop the feed of stock to the forming nip and the cutter die will be shifted without further forward feed of the stock, resulting in a cutoff of the expanded metal product which has issued from the forming nip.

Figure 10:
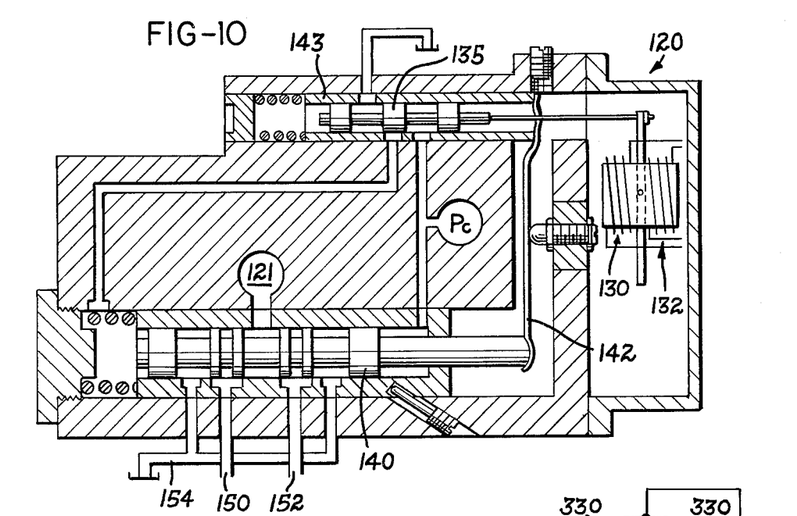
FIG. 10 is a schematic view showing a suitable hydraulic servo motor used in the controls of the presses described herein.

Timing of the shifting drive for the cutter die is provided by an electronic-hydraulic servo control system for the hydraulic cylinder 50 (FIG. 1). This system includes a signal generating device 110 which rotates in timed relation with fly wheel 15, as by connection through a timing belt or chain 111. The signal generating device may be in the form of a conventional "light chopper" device, or a magnetic signal pulse generator similar to that shown in FIG. 8. The output of the device 110 is connected through an electrical circuit line 112 to an electronic servo amplifier 115 (FIG. 11) which is of a known commerically available type. This amplifier, as will be explained, has electrical output control circuits, shown generally as passing through the conduit 116, to the hydraulic servo control 120, details of which are shown in FIG. 10. This control governs the supply of pressure hydraulic fluid from a supply pipe 121 to the opposite sides of the double-acting hydraulic cylinder 50. As previously explained, the output rod 45 of this cylinder is connected to shift the cutter die 55. A feed back arrangement is provided from rod 45 by a connection, shown generally at 123, to a feed back transducer, for example the potentiometer 125 which in turn is connected into the amplifier 115 by circuit lines passing through the conduit 126 (see also FIG. 11).

Figure 11:
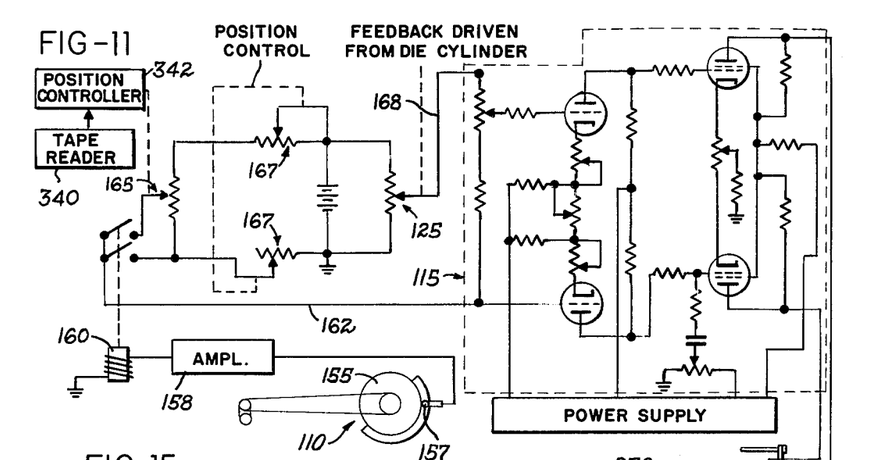
FIG. 11 is a schematic diagram showing the incorporation of a convential electronic servo amplifier in the controls of the machines.

The amplifier 115 is of a known type, as shown in FIG. 11, and it should be understood that this amplifier includes various known controls, which are shown herein schematically as contained in the control box 128 having circuit connections through a conduit 129 to the amplifier 115. These controls include a gain control for varying the ratio of the amplifier output with respect to its input (from the signal generating device 110), an equalizer control and a balancing control for adjusting and balancing the outputs in the push-pull stages of the amplifier, a "dither" control for imposing a fixed A.C. voltage on the amplifier output to overcome static friction in the hydraulic servo valve, and other suitable controls which are common in devices of this type.

Details of the hydraulic servo control 120 are shown in FIG. 10. The torque motor coils 130 and 132 are selectively energized to control movement of pilot valve 135. As is known in the servo motor art, shifting of the pilot valve will cause corresponding movement of the main servo valve 140, and feed back through lever 142 to the movable sleeve 143 surrounding the pilot valve 135, while the pressure fluid from the supply pipe 121 will be directed to one or the other of the hydraudic lines 150 and 152, while the opposite line is connected to tank or exhaust, as indicated schematically at 154. Thus, signals from the generating device 110 are amplified and through the servo control govern shifting of the output of the hydraulic cylinder 50 to which the lines 150 and 152 are connected at opposite ends. The timing relationship is such that this control shifts the cutter die 55 during the period when piston head 25 is moving through the lower half of its stroke, and the forming nip is open to permit advancing or the feeding movement of the sheet 60.

FIG. 11 shows a typical circuit arrangement incorporating the signal generating device 110 and the electronic servo amplifier 115 (from FIG. 1), together with feed back and position adjusting circuits therefor. For example, the signal generating device 110 may include a disc 155 driven at one-half the speed of the fly wheel and main shaft 18, and the disc controls passage of light to a photocell 157 such that the photocell transmits a signal through amplifier 158 during every other revolution commencing about 90° before bottom dead center of the piston head 25 and of a duration equal to 360° of shaft rotation. This signal may be used to energize the relay 160, causing it to complete a circuit through line 162 from the amplifier 115. The contacts of relay 160 are connected to an adjustable amplitude control potentiometer 165 which has applied across it a D.C. reference potential (indicated schematically as a battery) through the oppositely and concurrently adjustable position control potentiometers 167. The feed back potentiometer 125 is also connected across the D.C. reference potential and has its adjustable tap connected through line 168 to the servo amplifier. When the relay 160 is energized, there will be a positive potential applied through line 162 which will cause the amplifier 115 to energize an appropriate one of the torque motor coils 130 or 132, shifting the pilot valve 135 and thus causing the hydraulic cylinder to shift the cutter die. Movement of the cutter die causes a feed back movement of the potentiometer 125 which in turn will cause a control signal to pass through line 168 to the amplifier, which in turn will tend to energize the other of the torque motor coils and thus stop the motion of the servo pilot valve 135, thereby halting motion of the cutter die. It will be obvious to those skilled in the controls art that the amplitude of this shifting motion will be determined by the setting of potentiometer 165. Since this will determine when the signals, through lines 162 and 168, to the push-pull amplifier will be balanced. Therefore, when relay 160 is energized the cutter die will shift to one of its two "forming" positions.

During the next cycle of operation, in other words the next full rotation of shaft 18, relay 160 will be deenergized. Therefore, the signal through line 168 will cause the amplifier to energize an appropriate torque motor coil in the servo valve and the cutter die will be returned to its initial position. The location of this position can be adjusted by changing the position control potentiometers, which function together with the potentiometer 165 as a voltage divider circuit to determine the condition of the signals through the amplifier 115 to position the servo pilot valve.

FIG. 9 illustrates another embodiment of the invention wherein the cutter die is shifted by means of a mechanical drive directly related to the drive for the piston head 25 and the press element mounted thereon. Thus, the main drive shaft, a portion of which is indicated at 18a, carries a bevel pinion 200 which meshes with a larger bevel gear 202 fixed to a cutter drive shaft 205. The ratio between the pinion and gear is 1:2, in other words gear 202 rotates at half the speed of pinion 200. At its upper end the shaft 205 passes through a slide block 208, and an eccentric cam 210 is fixed to the end of shaft 205 and cooperates with the roller followers 212 mounted on the slide block 208 to produce a reciprocating movement of the slide block. This block is connected through a rod 215 to a slidably mounted die carrier 218 which provides a suitable mounting for the cutter die 55a and its stripper assembly indicated generally at 70a.

It will be apparent that with this arrangement the cutter die 55a is moved back and forth in the direction of arrow 219 and can be located at opposite ends of its reciprocating path of movement when the press element reaches successively its top dead center position. The cutter die thus shifts to one side for making a first cutting and forming operation, then shifts to the other side, with the extent of movement being determined by the contour of eccentric cam 210, for the other slitting and forming operation, and then back again.

Figure 12:
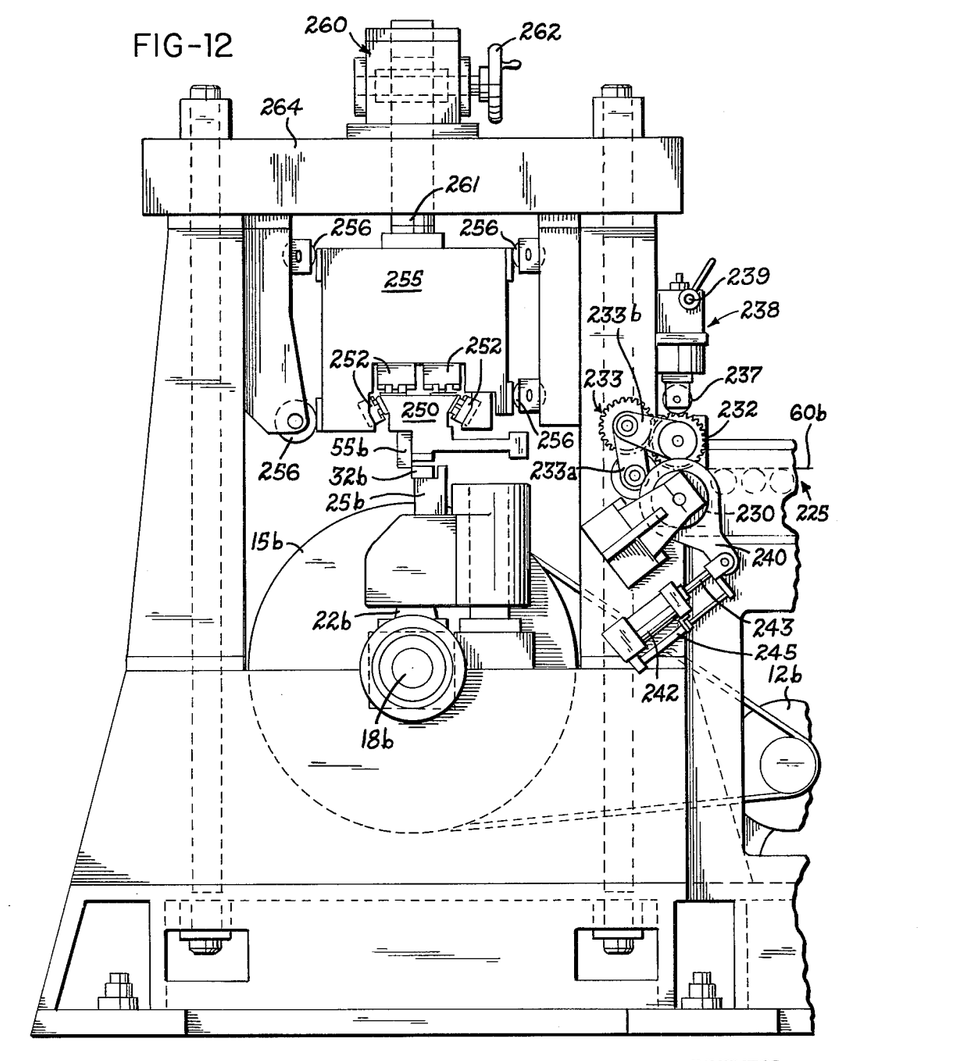
FIG. 12 is a side elevational view of another modified form of a press according to the invention.
Figure 13:
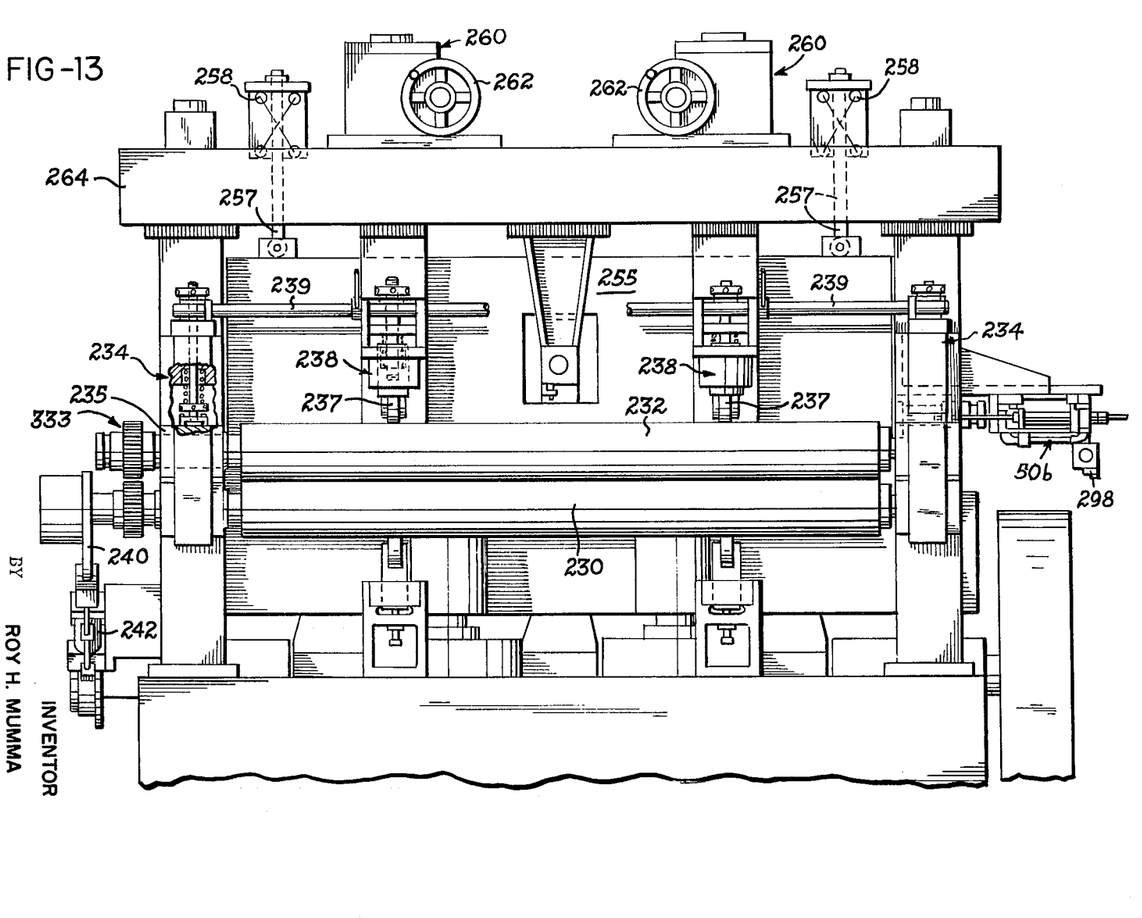
FIG. 13 is a front end view of the press as seen from the right of FIG. 12.

FIGS. 12 and 13 show a further embodiment of the invention, and here the infeed of stock material, indicated at 60b, advances into the press on a roller conveyor which is designated by the general reference numeral 225. The stock passes between a pair of feed rolls 230 and 232 which are provided with a 1:1 ratio gear train drive 233, for counter rotation thereof. This gear train includes the conventional swinging arms 233a and 233b which maintain the gear drive while permitting the upper roll 232 to raise or lower under control of the adjustment device 234 to accommodate different stock thicknesses. Rollers 237 are merely conventional roll back-up devices which have adjustable spring-loaded mounts 238 to resist bending of the rolls. Cam surfaces on shaft 239 (FIG. 13) when rotated, lift bearing blocks 235 and back-up rollers 237, thereby releasing the pressure of the top feed roll from stock 60b, allowing stock 60b to be freely inserted into, withdrawn from or adjusted in the machine.

The drive yoke or arm 240 corresponds to the crank 85 previously described. Thus, this crank is connected through a one-way clutch, to impart an intermittent angular drive motion to the feed rolls. The power to rock the arm or crank 240 is derived from a double-acting hydraulic cylinder 242 which has its piston rod 243 connected to the arm 240. This cylinder is also provided with a feed-back indicating device 245 (for example in the form of a potentiometer or a differential transformer), the condition of which is varied according to movement of the rod 243.

The general arrangement of the press element 32b and its associated piston head 25b are the same as described in connection with FIGS. 1 and 4, hence the same reference numerals with the suffix "b" are used. Furthermore, the drive for the connecting rod 22b is obtained from the main drive shaft 18b through fly wheel 15b which is in turn driven by the motor 12b.

The cutter die 55b is mounted in a slidable cross head 250 which is carried by suitable ways or guides 252 mounted in an adjustable carrier block 255. This block is adjustable in a generally vertical direction, being received by the guide rollers 256 carried on the main frame of the press, and being suspended from support rods 257 which are pivotally attached to block 255 and are acted on by springs 258 tending to raise the entire block and assembly. Adjustable jacks 260 (for example worm and pinion) act through rods 261 to move the block against the springs 258. There are at least two such rods 261, and two adjustment jacks 260 each being provided with a drive wheel 262, and these devices are mounted on the cross frame member 264 at the top of the press. It is also possible, of course, to provide remote control power drives for the jacks 260 if desired.

The main carrier block 255 can thus be adjusted vertically, carrying the cutter die cross head or slide 250 with it, to change the depth of cut and forming operation performed by the cutter die during each stroke of the press, as well as providing compensation to assure uniformity of forming across the entire width of the expanded metal block. The jacks 260 can also be adjusted individually to introduce camber into the expanded metal product, or to eliminate unwanted camber.

Figure 14:
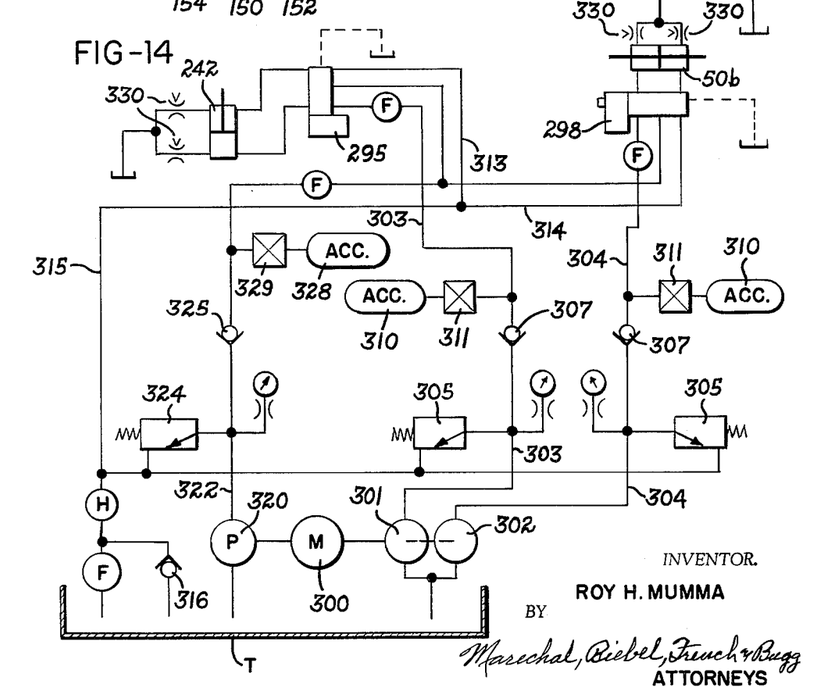
FIG. 14 is a schematic diagram of a suitable hydraulic circuit for controlling the machine shown in FIG. 12.
Figure 15:
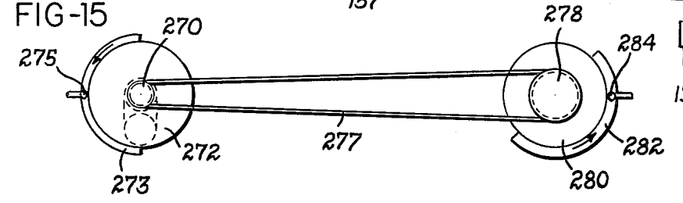
FIGS. 15 and 16 are diagrams of details of the controls for the machine shown in FIG .12.
Figure 16:
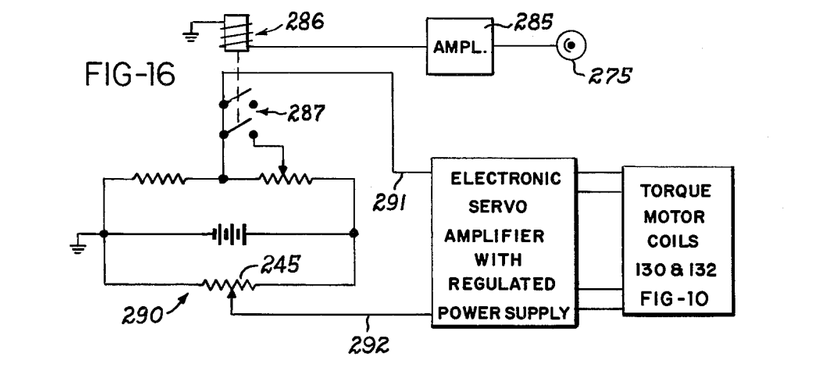

Suitable controls for the press shown in FIG. 12 are illustrated in FIGS. 14, 15 and 16, as well as the controls in FIGS. 10 and 11 which have been described. A driving sprocket 270 is carried on the shaft 18b, or driven directly therefrom at the same speed. Rotating with sprocket 270 is a "light chopper" provided by a disc 272 having a 180° flange or lip 273 which permits light to pass to a photocell 275 from a suitable light source (not shown) during half of a revolution of the crankshaft, while cutting off light to the photocell for the other half revolution. A chain 277 extends around sprocket 270 and a driven sprocket 278, the latter being twice the diameter of sprocket 270 and thus rotating at half the speed. This sprocket 278 drives a further light chopper arrangement including a disc 280 having a flange or lip 282, of 180° extent, such that light passes to a photocell 284, and is cut off from the photocell, once during each revolution of sprocket 278.

The photocell 275 is connected through a suitable amplifier (not shown) to control a servo valve (as in FIG. 10) which in turn controls the feed drive hydraulic cylinder 242. For example, referring to the control shown in FIG. 16, the photocell 275 supplies a signal to amplifier 285 which in turn controls relay 286. This relay has its contacts 287 connected into a control and feed back circuit 290, of the same general type as described in FIG. 11. Signals from this circuit pass through lines 291 and 292 to the electronic servo amplifier which may be of the same type described and shown in FIG. 11. This amplifier controls the torque motor coils of a hydraulic servo control 295 (FIGS. 10 and 14) which governs the supply of hydraulic pressure fluid to the feed drive cylinder 242. Thus, the timing and the length of stroke of the feed drive cylinder are controlled.

The photocell 284 controls shifting of the cutter die, and thus it can be connected into the same type of circuit as shown in FIG. 11, to control the operation of the hydraulic servo valve 298 which will in turn control the die shifting hydraulic cylinder 50b.

The hydraulic circuit shown in FIG. 14 is an example of a typical circuit which may be used with the machine shown in FIG. 12. It will be understood that the servo valve controls 295 and 298 may be of the general type shown in detail in FIG. 10. A drive motor, for example an electric motor 300, is connected to operate the supply pumps 301 and 302 which have output lines 303 and 304, respectively, extending to the servo valves 295 and 298. Thus, each of these valves and the associated hydraulic cylinders 242 and 50b is supplied from a separate pump circuit. In each of these circuits there is an adjustable pressure limiting relief valve 305. Each of these circuits also includes a check valve 307 and an accumulator 310 which is connected through a conventional needle valve 311 into the corresponding pressure supply line. The accumulator assures that there is a sufficient supply of hydraulic fluid under working pressure to meet any sudden demand upon the system by the servo valves. Each of the servo valves is also connected through return lines 313 and 314 to the return line 315 which returns hydraulic fluid into tank T through heat exchanger H and the filter F. This filter is provided with a conventional bypass check valve 316.

Control pressure for the servo control valve is supplied through a separate pump 320 having an output line 322 which includes a pressure relief valve 324 and a check valve 325. This line also is provided with an accumulator 328 and associated needle valve 329. The controlled pressure from line 322 is supplied to each of the valves 295 and 298 through the port marked Pc in FIG. 10.

The opposite sides of each of the hydraulic cylinders 242 and 50b are connected through adjustable needle valves 330 to a tank or exhaust line. The purpose of these valves is to provide a very small bleed orifice to assure that there is a slight flow of hydraulic fluid even when the pistons of these hydraulic cylinders are stationary. This flow will tend to minimize excessive heat accumulation due to the otherwise entrapped hydraulic fluid being subjected to high frequency, short stroke cycling.

Presses constructed according to the invention can be easily adapted to automatic operation in which various patterns are formed in the expanded metal product. For example, it is possible to change the position of the potentiometer 165 (FIG. 11) or equivalent transducer, and thereby alter the position at which the feedback transducer will reach a balance position during operation of the press. Thus, by introducing such a variable control, the successive positions which the cutter reaches may be varied in steps, or by infinite amounts.

As an example, a pattern control arrangement is shown in FIG. 11 embodying a perforated tape reading device 340 which can govern a position controller 342, which in turn is connected to position the wiper of potentiometer 165. In this manner, the wiper can be caused to step to successive predetermined positions, and the feedback potentiometer will follow up accordingly to position the cutter die in like manner. It will be appreciated by those skilled in the art that appropriate predetermined patterns can be provided by preparing a code tape or card for the reader 340. In the machine illustrated in FIGS. 12 and 13, it is likewise possible to provide such an automatic variable control for the feed cylinder 242 since it also is controlled by device such as shown in FIGS. 10 and 16.

While the forms of apparatus herein described constitute a preferred embodiment of the invention, it is to be understood that this invention is not limited to these precise forms of apparatus and that changes may be made therein without departing from the scope of the invention which is defined in the appended claims.

What is claimed is:

1. Apparatus for forming an expanded metal product from a strip of continuous metal stock, comprising a pair of counter-rotating stock feed rolls, feed means connected to rotate said rolls intermittently to feed a sheet of stock in incremental fashion along a predetermined straight line path, a generally rectangular press element having a flat upper surface terminating in a cutting edge, means mounting said press element with said surface extending generally parallel to said path and with said cutting edge on the downstream side of said element along said path, drive means connected to reciprocate said press element in a direction generally perpendicular to its said upper surface and in predetermined relation to operation of said feed means, a cutter die having a plurality of regularly spaced teeth projecting therefrom arranged in a line, each said tooth including a body portion and a projecting head portion of predetermined form, means mounting said cutter die with said teeth extending parallel to said cutting edge of said press element and adjacent to such edge to define therewith a slitting and expanding nip, said die and said press element being so arranged that reciprocation of said press element will carry a portion of a strip of stock across a part only of said teeth to form a plurality of spaced slits in the sheet of stock with the teeth pressing against that portion of the slit stock material immediately downstream of said slitting nip to stretch the sections of the stock beneath said teeth during each slitting stroke of said press element, and shifting means operated in timed relation to said drive means and connected to reciprocate said cutter die causing successive rows of slits formed in the stock to be offset from adjacent slits therein.

2. In a press for forming a perforated product such as screening from a strip of imperforate stock material, the combination of a press element having a cutting edge, a toothed cutter die separate from said press element and having a set of spaced aligned teeth thereon, drive means connected to reciprocate said press element through a cutting stroke toward said die and a return stroke away from said die, means mounting said die at a position along the path of motion of said press element such that said cutting edge moves partially past said teeth forming therewith a nip in which spaced slits are formed in the stock material and portions of the material beneath said teeth are formed generally to the tooth contour, and feed means operative to advance a strip of stock material in incremental fashion through said nip for causing successive transverse segments of said stock to be presented for cutting and forming.

3. In a press for forming a perforated product such as screening from a strip of imperforate stock material, the combination of a press element having a cutting edge, a toothed cutter die separate from said press element and having a set of spaced aligned teeth thereon, drive means connected to reciprocate said press element toward and away from said die, means mounting said die with respect to the path of motion of said press element such that cutting edge moves partially past said teeth forming therewith a nip in which spaced slits are formed in the stock material and portions of the material beneath said teeth are formed generally to the tooth contour, feed means operative to advance a strip of stock material in incremental fashion through said nip for causing successive transverse segments of the stock to be presented for cutting and forming, and shifting means operating in predetermined relation to said drive means connected to shift said die transversely of the strip of stock material while maintaining the operative nip forming relation between said die and said cutting edge to cause successive cutting and forming operations on the stock to be offset from each other by an amount equal to the movement of said die caused by said shifting means.

4. In a press for producing a perforated metal product, the combination of a reciprocable press element having a cutting edge, drive means connected to reciprocate said press element, a toothed cutter die having a plurality of aligned cutting teeth, means mounting said die in a predetermined position with respect to said press element such that said cutting edge moves partially past said teeth during each reciprocating movement to provide a forming and cutting nip between said die and said cutting edge, feed means operative to feed stock across said press element and through said nip in timed relation to movement of said press element presenting successive segments of the stock for cutting and forming, and means for shifting said cutter die back and forth along said nip between different forming positions to present the teeth of said die to different portions of the stock in successive forming operations.

5. A press as defined in claim 4 wherein said shifting means for said cutter die includes a shaft rotating at a predetermined fraction of the speed of reciprocation of said press element, and means including a cam on said shaft and a follower fastened to said cutter die forming a drive connection from said shaft to said cutter die for moving said die back and forth between two different forming positions such that it occupies the same position during alternate reciprocating movements of said press element.

6. A press as defined in claim 4 wherein said shifting means includes a hydraulic cylinder having a driving connection to said cutter die for changing the position thereof, a servo valve control connected to control the flow of hydraulic operating fluid to said cylinder to govern the movement thereof, a signal generating means arranged to operate at one-half the speed of reciprocation of said press element, and servo amplifier means receiving the signals from said signal generating means and connected to operate said servo operated valve to cause shifting movement of said cutter die from one forming position to another during the time when said forming nip is open.

7. A press as defined in claim 6 wherein said feed means includes a pair of feed rolls and a drive for said rolls including a hydraulic drive cylinder, means forming a drive connection between said drive cylinder and said feed rolls to rotate said rolls in a stock advancing direction in incremental fashion, a second servo valve control governing the supply of hydraulic fluid to said feed drive cylinder, and control means for said second servo valve control responsive to said signal generating means and including apparatus for coordinating the operation of said feed drive cylinder with the reciprocation of said press element to actuate the feed drive cylinder during that portion of movement of the press element when said cutting edge is withdrawn from said die.

8. In a press for producing a perforated metal product, the combination of a reciprocable press element having a cutting edge, drive means connected to reciprocate said press element, a toothed cutter die having a plurality of aligned cutting teeth, adjustable means mounting said die in a predetermined position with respect to said press element such that said cutting edge moves equally past a portion of each of said teeth during each reciprocating movement to provide a forming and cutting nip between said die and said cutting edge, feed means operative to advance said stock across said press element and through said nip in timed relation to movement of said press element presenting successive segments of the stock for cutting and forming, means for shifting said cutter die back and forth along said nip between two forming positions to present the teeth of said die to different portions of the stock in successive forming operations, and adjustment devices connected to said die mounting means for varying the alignment of said teeth with respect to said cutting edge for controlling camber in the perforated product.

9. A press as defined in claim 4 wherein said feed means includes a pair of feed rolls, a drive for said rolls including a hydraulic feed drive cylinder and a drive connection between said cylinder and said rolls arranged to rotate said rolls in opposite directions with respect to each other to cause stock engaged between said rolls to advance toward said forming nip by a predetermined amount corresponding to the angular movement of said rolls, a servo valve control governing the supply of hydraulic fluid to said feed drive cylinder, and control means for said servo valve control responsive to said signal generating means and arranged to coordinate the operation of said feed drive cylinder with the reciprocation of said press element and adjustable to vary the timing and the extent of feed drive movement imparted to said feed rolls.

10. In a press for producing a perforated metal product, the combination of a reciprocable press element having a cutting edge, drive means connected to reciprocate said press element, a toothed cutter die having a plurality of aligned cutting teeth, means mounting said die in a predetermined position with respect to said press element such that said cutting edge moves partially past said teeth during each reciprocating movement to provide a forming and cutting nip between said die and said cutting edge, feed means operative to feed stock across said press element and through said nip in timed relation to movement of said press element presenting successive segments of the stock for cutting and forming, means for shifting said cutter die back and forth along said nip between two forming positions to present the teeth of said die to different portions of the stock in successive forming operations, control means for governing said shifting means, and a record responsive device operative on said control means to govern the function of said control means according to a predetermined program.

11. In a press as defined in claim 10, a second control means governing the operation of said feed means, and means for adjusting said second control means to produce a corresponding adjustment in the timing and in the extent of movement of said feed means.

12. In a press for producing a perforated metal product, the combination of a reciprocable press element having a cutting edge, drive means connected to reciprocate said press element, a toothed cutter die having a plurality of aligned cutting teeth, means mounting said die in a predetermined position with respect to said press element such that said cutting edge moves partially past said teeth during each reciprocating movement to provide a forming and cutting nip between said die and said cutting edge, feed means operative to feed stock across said press element and through said nip in timed relation to movement of said press element presenting successive segments of the stock for cutting and forming, means for shifting said cutter die back and forth along said nip between two forming positions to present the teeth of said die to different portions of the stock in successive forming operations, control means for governing said feed means, and a record responsive device operative on said control means to govern the function of said feed means according to a predetermined program.

References Cited by the Examiner

UNITED STATES PATENTS

| 1,815,487 | 7/1931 | Sindelar | 29—6.2 |
| 2,127,028 | 8/1938 | Hayssen | 226—156 |
| 2,244,305 | 6/1941 | McNeil | 29—6.2 |
| 2,379,682 | 7/1945 | Colucci | 83—365 |
| 2,641,715 | 6/1953 | Hull | 80—56.2 |
| 2,790,427 | 4/1957 | Carson | 137—625.61 |
| 2,819,070 | 1/1958 | Herr | 226—156 |
| 2,896,588 | 7/1959 | Hayner | 137—625.61 |
| 2,959,191 | 11/1960 | Schuman | 137—625.61 |
| 2,978,158 | 4/1961 | Herr | 226—156 |
| 2,994,304 | 8/1961 | Shultz | 137—625.61 |
| 3,054,310 | 9/1962 | Varner | 80—56 |
| 3,069,608 | 12/1962 | Forrester | 90—13.99 |
| 3,078,734 | 2/1963 | Wiig | 226—156 |

FOREIGN PATENTS 193,625    3/1923    Great Britain.

OTHER REFERENCES

Commercially Available Electrohydraulic Servo Valves, Control Engineering, N.Y., McGraw-Hill, June 1956, TJ 212, C6.

RICHARD H. EANES, JR., *Primary Examiner.*